Patented Apr. 28, 1931

1,802,390

UNITED STATES PATENT OFFICE

EMIL E. NOVOTNY, OF PHILADELPHIA, PENNSYLVANIA, ASSIGNOR TO JOHN STOGDELL STOKES, OF SPRING VALLEY FARMS, HUNTINGDON VALLEY P. O., PENNSYLVANIA

SYNTHETIC RESIN AND METHOD OF MAKING THE SAME

No Drawing.    Application filed August 14, 1926.   Serial No. 129,283.

This invention relates to the manufacture of synthetic resins and plastics where resorcin is utilized as a part of the required phenolic body in the reaction with preferably an aldehyde body. Various phenolic bodies, such as phenol, in its chemically pure or unrefined grades, may be used or for that matter its various homologues or substitution products such as the cresols, naphthols, xylenols or mixtures of these may be utilized for my purpose.

This application is directed to the product resulting from, and the method of combining such phenolic bodies wherein only a part of such phenolic body is resorcin. The portion of resorcin may be added prior to, during or after the reaction of the other phenolic body or bodies with the preferred aldehyde. Various aldehydes such as formaldehyde, fural, benzaldehyde, butylaldehyde, and also carbohydrates, and polyhydric alcohols, their derivatives, polymers and substitution products, or mixtures of these may be used for my purpose.

The object of the invention is primarily to use a substantial quantity of a relatively cheap phenolic body and only a minimum quantity of an expensive phenolic body such as resorcin, and thereby reduce the cost of the product, stabilize the reaction, and at the same time increase the reactivity of the combined resinous product through the use of the highly reactive resorcin body. The resorcin, therefore, is utilized as an accelerating and hardening agent for a synthetic resin preferably having a small amount of an active methylene body such as paraformaldehyde incorporated or added therewith. This addition of resorcin with or without the addition of the paraformaldehyde may be made either before, during or after the resin forming reaction ensues. To incorporate the resorcin or resorcin-paraformaldehyde hardening agent suitable solvents may be used or the hardening agent may be finely ground and mixed with the resin, composition or molding plastic in any suitable manner.

The reaction of resorcin with formaldehyde or its dehydration or polymerization products is extremely rapid and therefore controllable with difficulty and special precautions are necessary if a useful fusible and preferably soluble resinous product is to be made. This rapid reactivity of resorcin in the presence of an active methylene body such as paraformaldehyde is dealt with in more detail in my copending applications filed August 7, 1926, and August 14, 1926, Serial Numbers 127,974 and 129,282 respectively; the latter has matured into Patent 1,767,696. The use of phenol or phenolic bodies other than resorcin having added thereto an amount of resorcin will be more reactive than where no resorcin is present, the product will have greater strength, and no catalyst is required. There is also a material saving in cost over the methods described where resorcin is used alone as the phenolic body.

The use of a small amount of resorcin with phenol for example, enables me to produce a quick reaction product using a high grade phenol with such aldehydes as formaldehyde and furfural at ordinary atmospheric pressures, and which will be a fusible resin of great reactivity and with which no condensing agent need be used. This results in end products of high electrical efficiency even at high radio frequencies, having good mechanical properties and strength. The high electrical efficiency of a synthetic resinous binder of high purity free from condensing agents results in a low power factor and, therefore, a low phase difference. Of course, to obtain the very highest results the choice of fillers to be mixed with this binder is likewise important and care should be taken that these are as free as possible from bases or acids or products of this nature usually used as condensing agents. The filling material is less likely to be affected when the resinous material is free from bases, acids or their salts as there will be less ionization and hydrolysis in the molding plastic when under severe electrical stresses.

This product has high mechanical strength and has the good electrical values of hard rubber without its objectionable qualities, and is therefore a valuable insulating material and binder for such purposes as in radio apparatus where an increased efficiency is shown when these products are used for tube bases, sockets, coil and condenser forms, panels, bases, and mounting strips.

The synthetic resins herein described are intended for use as ingredients for varnishes or lacquers or as resinous binders to be incorporated with various filling materials of either organic or inorganic nature. Therefore, suitable solvents may be used therewith and thereby materials may be coated or impregnated readily or the dry resinous or sludgelike products may be mixed with the filling or extending materials in any suitable or well known manner.

Various lubricants of a liquid, oily or solid nature may be added and, likewise, various plasticising agents may be incorporated therewith in a manner similar to the introduction of these products in other synthetic resins or their derivatives. Colors and pigments may be added to the original reacting ingredients or may be added to the resins or varnishes when formed. The pigments are preferably added in colloidal suspension when introduced into varnishes.

The use of various condensing agents is permissible for some purposes and among these may be mentioned the various useful acids and bases or their salts although it is to be understood that preferably such condensing agents are not used.

Although hydroquinone is not so reactive as resorcin it is to be understood that this material may be used as a substitute therefor, which is clearly indicated in the copending applications previously mentioned. Where phenol is called for it is to be understood as covering various phenolic bodies such as the homologues of phenol, excluding, however, from this term the use of resorcin and hydroquinone which are treated in this application by specific mention wherever they are to be used. This is done in order that the claims, etc., will not be unnecessarily burdened with the cumbersome phrase such as, phenol, its homologues excepting resorcin and hydroquinone.

The use of resorcin or hydroquinone in small proportion to a resinous product formed of other phenolic bodies will materially hasten the reaction of such resinous bodies and therefore the use of the resorcin and hydroquinone is broadly covered as a hardening or accelerating agent for any synthetic resin product, preferably utilizing a phenolic body other than the resorcin or hydroquinone. The addition of resorcin or hydroquinone alone to a synthetic resin made of a phenolic body will very materially increase the speed of reaction or will materially decrease the temperature at which the reaction will take place in the same length of time.

An active methylene body in condition to combine with the resorcin or hydroquinone, preferably paraformaldehyde, when mixed in the proportions of one mol. resorcin to one-half to one mol. paraformaldehyde reacts very violently when the temperature is brought up to say 175 to 212° F., and the exothermic nature of the reaction raises the temperature very materially, resulting in a product having the maximum hardening effect when incorporated or mixed with various resinous materials, possibly due to the rapid rise in temperature of the entire mass because of the heat generated between the reagents mentioned. Therefore a mixture of resorcin or hydroquinone, preferably containing a suitable amount of paraformaldehyde, when added to any type of synthetic resin or varnish may be used as a hardening agent therefor and the speed of the reaction may be controlled by the proportion of hardening ingredients added and, furthermore, by the ratio of paraformaldehyde to the resorcin.

The following examples are given by way of illustration, but it is to be understood that changes can be made in the combination of ingredients used, their proportions and treatment within a wide range without departing from the spirit of the invention.

*Example 1*

| | |
|---|---|
| Resorcin | 15 |
| Phenol | 45 |
| Paraformaldehyde | 31 |

The quantities given are all parts by weight. Place these materials into a suitable digester, but for ordinary small batches an ordinary open Pyrex beaker may be used. Place beaker with contents in a water bath and heat contents to from 200 to 212° F. until the product has gone into solution and the desired viscosity has been obtained. The reaction is quite slow and can be stopped at any point in order to produce the desired sludge or hard, grindable resin. While still hot a suitable solvent may be added in order to quickly stop the reaction, such as, for example, alcohol, whereby a suitable varnish can thus be made. If the dry resin, however, is being produced, the contents of the digester or kettle are either cooled or emptied into suitable cooling pans so that a rapid cooling is given the final product. This material after being heated for about 15 minutes at a temperature of from 200 to 212° F. will go to a rubbery mass which is no longer soluble but which is still fusible. This is extremely desirable as the fusible, soluble product previously described may by molding or pressing at relatively low temperatures be ejected in its insoluble, rather firmly set, rubbery form for subsequent hardening where a large per diem production from a die is desirable. This rubbery mass fuses and forms a very suitable cementitious binder and will upon a short heating at temperatures higher than those given, but preferably at temperatures higher than 250° F., go rapidly to its final hard, set, insoluble and relatively infusible form.

It will, therefore, be noted that we have a product of high reactivity which does not require a condensing agent and is therefore free from all extraneous materials and which sets more rapidly than the ordinary phenol formaldehyde plus catalyst products as produced heretofore. This material when in its fusible, soluble form or in its fusible or rubbery form may be readily mixed with various fillers, etc., to produce sheeted or comminuted molding plastics. The soluble product is very well adapted for use as a varnish or lacquer material and when in such form may be readily impregnated into various open structures or may be used as a coating or facing for any suitable material. No further hardening agent need be added to this product as it is extremely rapid in its reaction.

*Example 2*

| | |
|---|---|
| Resorcin | 47 |
| Phenol | 70 |
| Furfural | 100 |

The quantities given are all in parts by weight. Place contents in a suitable digester provided with suitable condensers for refluxing and distillation and having a suitable stirring device if large quantities of material are to be operated upon. For small batches of material, however, the ingredients may be placed into an ordinary open Pyrex beaker, the beaker placed in an oil bath and the contents of the beaker heated to 310° F. A moderate reaction ensues and the reaction is allowed to proceed at the temperature given for a period of approximately one-half hour or until the desired combination, viscosity or hardness of resin, has been obtained. The contents of the beaker are now cooled by emptying the contents into suitable cooling pans. With a heating of approximately one-half hour a sludge is usually obtained, but upon heating for a period somewhat longer than this a hard, grindable resin is obtained. The resin is of a dark brown color, is translucent in thin sections and rather opaque in heavy bodies. It is soluble in organic solvents such as other synthetic resins are soluble in and therefore may be used for making varnishes and lacquers. The product is potentially reactive in that it will without the addition of a hardening agent, upon heating for a number of hours at temperatures about 310° F., assume a hard, set and infusible form. If the duration of the hardening is to be decreased we may add to this varnish or resinous body a suitable hardening or accelerating agent. This may consist in the addition of from 1 to 15% of hexamethylenetetramin or from 1 to 10% of paraformaldehyde. The reaction is fastest when paraformaldehyde is used as the paraformaldehyde seems to have a high reactivity with either the combined resorcin in the resin or with whatever free resorcin may still be present.

*Example 3*

A somewhat harder modification and a product having greater strength than that recited under Examples 1 and 2 may be produced by the use of the following proportions of ingredients:

| | |
|---|---|
| Resorcin | 30 |
| Phenol | 30 |
| Paraformaldehyde | 30½ |

Proportions are all in parts by weight. The materials are preferably placed into an open, glass, Pyrex beaker, the beaker placed in a water bath and great care being taken that there is no appreciable amount of superheating. The contents of the beaker are heated to a temperature not to exceed 216° F. The heating is gradual and it requires about 15 minutes to reach the temperature given. At this point it will be found that a resin forming reaction has occurred and the contents of the beaker are rapidly cooled down to below 120° F. by any suitable means such as, preferably, emptying the contents of the beaker into suitable cooling pans. This reaction if carried on at temperatures higher than this becomes an extremely violent one and therefore precautions are necessary in order that the product may not go to infusibility almost instantly. The resin is of a very clear, light color, is soluble in suitable solvents, and may be easily carried along to the point where it is grindable. No additional hardening agents are necessary as the proper proportion of resorcin and paraformaldehyde is present with the phenol to carry the product over to its final, set and infusible form at somewhat elevated temperatures. The product may be readily mixed in its resinous reacted form with various filling materials in any well known manner.

*Example 4*

This example is given to show that a wide variation may be practiced in the quantity of paraformaldehyde used and that products of practically the same reactivity and same degree of infusibility may be obtained as, for example, the products given under Example 1.

| | |
|---|---|
| Resorcin | 15 |
| Phenol | 45 |
| Paraformaldehyde | 10 |

All parts by weight. Place materials into a suitable glass beaker. Beaker and contents are placed in a water bath and contents heated, being careful not to superheat, to a temperature of from 200 to 212° F. until the reaction product has been formed and until the desired hardness or viscosity has been obtained. After 15 minutes heating at this temperature the product will go to the rubbery stage resembling and acting similarly to the product described under Example 1. Prior to the rubbery stage having been reached, however, the material is soluble and fusible and both products, of course, that is, the soluble, fusible or merely the fusible and rubbery products, are potentially reactive in that they will go to their final infusible form when heated longer and preferably at elevated temperatures.

*Example 5*

This example, together with the two other examples following, illustrates the use of a mixture of resorcin or hydroquinone plus an active methylene body as a hardening agent for previously made synthetic resin products or mixtures of these with filling materials in the form of, say, molding powders.

Phenol furfural basic catalyst resin_ 10
Equimolecular weights of resorcin and paraformaldehyde _____ ½ to 1½

Proportions given are all parts by weight. Mix thoroughly either in a dry state or in solution in a varnish or introduce on the mixing rolls in order that a uniform mixture will be obtained. The product upon being heated at temperatures somewhat over 310° F. will melt down and the entire mass will go to a state of infusibility and insolubility in an extremely short time. The product has the advantage over hexamethylenetetramin in that no catalyst is really necessary so far as the hardening reaction is concerned and that at the same time the reactivity of the mixture of resorcin and paraformaldehyde is much more rapid than if paraformaldehyde were used alone. The addition of resorcin alone will help to speed up the reaction, but I find it preferable to add the paraformaldehyde as the greatest speed is thus obtained. The product has a further advantage in that fewer flow marks are caused on the surface, and the finish of the mold is kept clean and polished. As a matter of fact, this mixture when introduced into suitable filling materials makes a very satisfactory medium for the removal of mold stains. Because of the intensive study the applicant has made in connection with resins made of various phenolic bodies and furfural, this resin was preferably shown as an example. It should, however, be understood that other types of synthetic resins such as, for example, those made of phenol formaldehyde, phenol carbohydrate, phenol acetaldehyde, or phenol acetylene can be used in place of the resin mentioned.

*Example 6*

Various phenolic bodies may be used for the resin to be hardened with the resorcin or combination of resorcin and paraformaldehyde. This example shows a manner of hardening a resin made of xylenol and formaldehyde.

Xylenol, commercial grade_____ 61
Formaldehyde, 37%_____ 40.5

All parts by weight. Produce a varnish in the manner described in my copending application, Serial No. 127,482, filed August 5, 1926, or for that matter in any other suitable manner. To this material, preferably in varnish form, a mixture of resorcin and paraformaldehyde is added, preferably in an amount say from 1 to 15% of the resin solids content of the varnish. The proportion of paraformaldehyde to resorcin may be in the ratio of one mol. to one mol. or the paraformaldehyde proportion may be somewhat lower, but preferably not lower than one-quarter mol. of paraformaldehyde to one mol. resorcin. The resorcin paraformaldehyde product may be mixed merely mechanically or dissolved in the resin in suitable manner, or may be caused to preliminarily react to a slight extent in order to increase its solubility in various varnish solvents. Upon heating, the product quickly goes to an infusible form, and it will be noted that no condensing agents are called for in this example.

*Example 7*

A molding powder consisting of various fillers such as, for example, wood flour, asbestos or other organic or inorganic fillers, may be mixed or impregnated with a suitable synthetic resinous product which may be of either the permanently fusible or the potentially reactive type. To this product preferably a mixture of resorcin and paraformaldehyde in about the same proportions mentioned in the preceding examples to the weight of the resin in the molding powder is added, either before the molding powder is made but preferably after it had been ground and comminuted, when this hardening agent is mixed therewith. In this manner the mixture of resorcin and paraformaldehyde will give a molding powder having excellent qualities for preforming in that the slight heating during the action of preforming will cause the paraformaldehyde resorcin mixture to form an intermediate condensation product having high cementitious qualities. Upon subsequent pressing and heating in a mold, the product goes to infusibility rapidly.

What I claim is—

1. A resinous reaction product of a phenolic body and an aldehyde having a hardening agent comprising resorcin added thereto.

2. A resinous reaction product of a phenolic body and an aldehyde having a hardening agent comprising resorcin and an active methylene body added thereto.

3. A resinous reaction product of a phenolic body and an aldehyde having a hardening agent comprising resorcin and paraformaldehyde added thereto.

4. A new composition of matter comprising a fusible condensation product of a phenolic body and an aldehyde having resorcin mixed therewith as an accelerating and hardening agent, said composition being convertible by heat into a hard, insoluble and infusible body.

5. In the art of producing phenolic condensation products, the herein described method of accelerating the rate of reaction between the mixture of a phenolic body and an aldehyde, when subjected to heat, which comprises adding a polyhydric phenol to such mixture.

6. In the art of producing phenolic condensation products, the herein described method of accelerating the rate of reaction between the mixture of a phenolic body and an aldehyde, when subjected to heat, which comprises adding resorcin to the mixture as an accelerating agent.

7. The herein described method of making a resinous reaction product of the potentially reactive type consisting in the step of introducing resorcin in a relatively small quantity to a mixture of a phenolic body and an aldehyde whereby the reactivity of the mass is accelerated and controlled when subjected to heat.

8. The herein described method of producing phenolic condensation products which comprises adding resorcin as an accelerating agent and also as a hardening agent to a mixture of a phenolic body and an aldehyde and subjecting the mass to the action of heat.

9. The herein described method of producing phenolic condensation products which consists in subjecting a mixture of phenol and an aldehyde to the action of heat in the presence of resorcin as a hardening agent.

10. The herein described method of producing phenolic condensation products which consists in subjecting a mixture of phenol and an aldehyde to the action of heat in the presence of a hardening agent comprising a mixture of resorcin and an active methylene body.

11. The herein described method of producing phenolic condensation products which consists in subjecting a mixture of phenol and an aldehyde to the action of heat in the presence of a hardening agent comprising a mixture of resorcin and paraformaldehyde.

Signed at Philadelphia in the county of Philadelphia and State of Pennsylvania this twelfth day of August, A. D. 1926.

EMIL E. NOVOTNY.